July 14, 1936.  E. R. HARRAP  2,047,584
MANUFACTURE OF COMPOSITE SLABS, BLOCKS, OR TILES
Original Filed Nov. 7, 1934
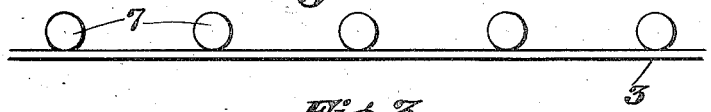
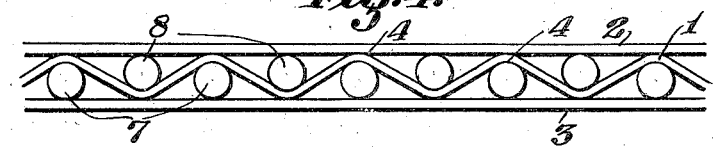
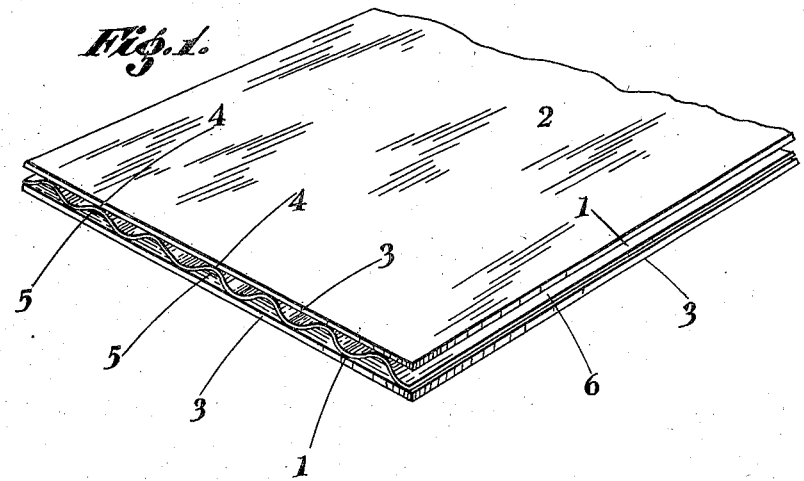
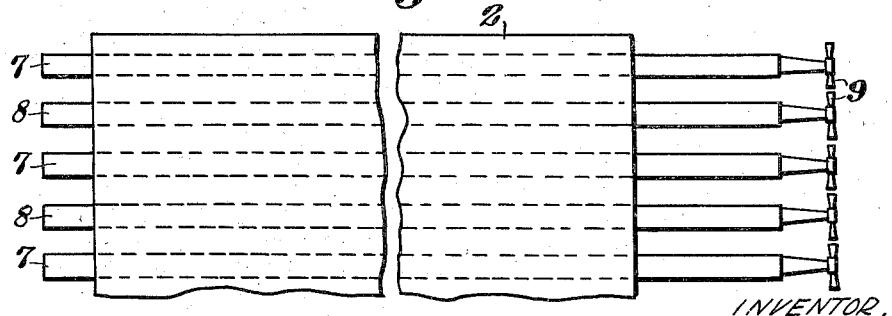
INVENTOR.
E. R. HARRAP.
BY
Blair Kilcoyne
ATTORNEYS.

Patented July 14, 1936

2,047,584

UNITED STATES PATENT OFFICE 2,047,584

MANUFACTURE OF COMPOSITE SLABS, BLOCKS, OR TILES

Eric Russell Harrap, Chorlton-cum-Hardy, England

Original application November 7, 1934, Serial No. 751,926. Divided and this application May 11, 1935, Serial No. 21,057. In Great Britain December 7, 1933

6 Claims. (Cl. 154—33)

This invention relates to the manufacture of slabs of asbestos-cement or like composition. The term "slab" is used generically to include blocks, tiles and similar articles used in building. At the present time plane or corrugated tiles or slabs of asbestos cement are used in very large quantities for the construction in particular of roofs and also of floors and walls.

When either plane sheets or corrugated sheets of asbestos cement are used as roofing materials, it is a defect of the resultant roof that the sheets are sometimes unable to withstand a sudden shock or impact, such as is produced if workmen operating on the roof should jump or fall down on to it from a height exceeding about two feet. With a view of obviating this risk, corrugated asbestos-cement sheets or slabs have been reinforced by means of metal strips embedded within them. The production of such reinforced sheets or slabs is however somewhat complicated.

An object of the invention is to provide an extremely simple method of producing an asbestos-cement slab or the like of considerable strength. Other objects will hereinafter appear.

The composite slabs made according to the invention comprise two plane sheets made of a composition consisting of asbestos and a binding agent such as cement or a cement substitute enclosing a corrugated sheet of the same or similar material.

Such a composite slab possesses very great advantages of strength in comparison with the asbestos-cement sheets or slabs that are commonly used at present and is much lighter than articles of equal strength made from other materials. It is in fact found that such composite slabs will withstand very substantial impact stresses and at the same time are so light that they can advantageously be used not only for the manufacture of roofs or floors but also of walls.

In the preferred process according to the present invention, a freshly made wet plane sheet of asbestos-cement is laid on a perfectly plane surface and rigid rods which may be solid or hollow are then equally spaced on the surface of this sheet. A second plane sheet is laid over the rods and pressed or rolled between them into a corrugated sheet, the bottom of the corrugations coming into contact with the first plane sheet. It is desirable to spread cement or asbestos-cement between the rods in order to join the plane and corrugated sheets firmly along their lines of contact. A further series of rods is now placed in the depressions which have been formed and another plane sheet is laid over them. As before, it is advantageous to treat the top of the corrugations, that is to say, the parts between the second set of rods, with cement or asbestos-cement in order to secure the corrugated sheet and the second plane sheet along their lines of contact. The whole slab is now rolled or pressed to give it the desired thickness, the pressure also serving to unite the plane sheets and corrugated sheet firmly along their lines of contact. The presence of the rigid rods during this process prevents any distortion of shape. These rods can be withdrawn either immediately after the termination of the pressing or can be left until the block has set, though in practice it is generally found preferable to withdraw them immediately after pressing. If the rods are required for reinforcement they can of course be left permanently in position and be made of a suitable strength for the purpose.

One slab made by the novel process will now be described by way of example with reference to the accompanying drawing in which;

Fig. 1 illustrates a perspective view of the completed slab.

Figs. 2, 3, and 4 illustrate the successive steps of the process by which the slab is formed.

Fig. 5 is a fragmentary plan view of the slab prior to the removal of the corrugating rods.

The slab consists of a corrugated sheet 1 of asbestos-cement secured between two rectangular plane sheets 2 and 3 of the same material, the lines of contact between the corrugated sheet and the plane sheet being equidistant from each other and parallel to the long edge of the rectangular sheets. The corrugated sheet is secured to the plane sheets along the lines 4 by means of cement, asbestos-cement or similar binding composition by the process described.

When it is desired to join together two or more such slabs they are placed either end to end with the compartments 5 of each slab registering with each other or else they may be placed with their longer edges in contact. In the latter case the open end compartment 6 of each slab will form each half of a closed compartment in the combined slab. In either case the union is effected by filling adjacent compartments of the two slabs with cement, although when the two slabs are being joined along their shorter edges it is not necessary to fill all the registering compartments with cement.

The slabs are equally adapted to be joined to a wall or other fixed object and for this purpose the slab is placed in the desired position and may be attached to the wall by placing cement in one or more of the compartments enclosed between the wall and the sheets 1, 2, and 3.

If it is desired to reinforce a structure made from a number of such composite slabs it is a simple matter to pass iron or like stay bars or tubes down the registering longitudinal spaces within the composite slabs or the like or these reinforcing bars or tubes may be inserted during manufacture as described above.

In constructing a slab of this character, the sheet 3 is first laid down whereby alternate corrugating rods 7 are placed in parallel spaced relation as shown in Fig. 2, after which the corrugated sheet 1 is laid thereover and the reinforcing or corrugating rods 8 are placed intermediate the rods 7. The top sheet 2 is then applied and cemented to the corrugated sheet 1 along the lines 4. After the slabs are set, the corrugating bars may be easily removed by means of the handles 9 at the end.

The present application is a divisional of my co-pending application, Serial No. 751,926, filed on November 7th, 1934.

I claim:

1. In a process for the production of a composite slab, the steps which comprise forming a moist sheet consisting of asbestos and a binding agent, corrugating said sheet between two plane sheets of the same or similar composition while said sheet is still in the moist state, and then causing the whole to set to give an integral article.

2. In a process for the production of a composite slab, the steps which comprise forming a moist sheet consisting of asbestos-cement, corrugating said sheet between two plane sheets of the same or similar composition while said sheet is still in the moist stage, and then causing the whole to set to give an integral article.

3. In a process for the production of a composite slab, the steps which comprise placing a moist sheet consisting of asbestos and a binding agent between two plane sheets of the same or similar composition, corrugating said moist sheet by interposing rigid rods between it and the outside sheets, said sheet being brought into contact alternately with each of said plane sheets, pressing the resultant slab, and then causing said slab to set to give an integral article.

4. In a process for the production of a composite slab, the steps which comprise placing a moist sheet consisting of asbestos and a binding agent between two plane sheets of the same or similar composition, corrugating said moist sheet by interposing rigid rods between it and the outside sheets, applying a binding agent along the lines of contact between this corrugated sheet and said plane sheets, pressing the resultant slab, and then causing the said slab to set to give an integral article.

5. In a process for the production of a composite slab, the steps which comprise placing a moist corrugated sheet consisting of asbestos and a binding agent between two plane sheets of the same or similar composition, corrugating said moist sheet by interposing rigid rods between it and the outside sheets, applying a binding agent along the spaces between the rods, bringing said corrugated sheet into contact with said plane sheets, pressing the resultant slab, and then causing said slab to set to give an integral article.

6. In a process for the production of a composite slab, the steps which comprise placing a moist sheet consisting of asbestos and a binding agent between two plane sheets of the same or similar composition, corrugating said moist sheet by interposing rigid rods between it and the outside sheets, said sheet being brought into contact alternately with each of said plane sheets, pressing the resultant slab, removing said rigid rods, and then causing said slab to set to give an integral article.

ERIC RUSSELL HARRAP.